United States Patent
Husted et al.

[11] Patent Number: 6,135,010
[45] Date of Patent: Oct. 24, 2000

[54] COFFEE MAKER WITH COMPUTERIZED STEEPING CONTROL

[75] Inventors: Royce Hill Husted; Joel Peter Husted, both of Forest, Va.

[73] Assignee: Royce H. Husted, Forest, Va.

[21] Appl. No.: 09/427,717

[22] Filed: Oct. 27, 1999

Related U.S. Application Data

[63] Continuation-in-part of application No. 09/377,852, Aug. 20, 1999, abandoned, which is a continuation-in-part of application No. 09/256,344, Feb. 22, 1999, abandoned.

[51] Int. Cl.[7] .................................................. A47J 31/00
[52] U.S. Cl. ................................ 99/319; 99/283; 99/297; 99/299
[58] Field of Search .............................. 99/319, 318, 297, 99/295, 299, 283

[56] References Cited

U.S. PATENT DOCUMENTS

| | | | |
|---|---|---|---|
| 2,566,914 | 9/1951 | Worst | 99/319 X |
| 3,279,351 | 10/1966 | Cohn | 99/297 X |
| 4,401,014 | 8/1983 | McGrail et al | 99/283 |
| 5,027,696 | 7/1991 | Antonini | 99/318 X |

*Primary Examiner*—Reginald L. Alexander
*Attorney, Agent, or Firm*—Nicholas A. Camastro

[57] ABSTRACT

A computer controlled coffee steeping machine which extracts a minimum of undesirable acids and a maximum of desirable flavorings by steeping the grinds at a low temperature for a long time. The computer is programmed to maintain the lowest water temperature possible for producing a full flavored coffee within a time period selected by the user. At the end of the steeping period, the computer triggers the release of a spring propelled filter basket which lifts the grinds out of the liquid. Finally the coffee is automatically heated to drinking temperature.

9 Claims, 4 Drawing Sheets

COFFEE MAKER WITH COMPUTERIZED STEEPING CONTROL

CROSS-REFERENCE TO RELATED APPLICATIONS

This application is a Continuation-In-Part of application Ser. No. 09/377,852, filed Aug. 20, 1999, now abandoned, which is a Continuation-In-Part of application Ser. No. 09/256,344, filed Feb. 22, 1999, now abandoned.

BACKGROUND AND SUMMARY OF THE INVENTION

This invention relates generally to devices for brewing and steeping coffee and particularly to a machine which delivers a superior coffee flavor by extracting only the most desirable substances from the coffee grinds. Most coffee brewing machines extract coffee flavorings with steaming hot water. Hot water brewing processes will extract acids along with the coffee flavorings. The acid content is undesirable because it causes a bitter taste and some people may even experience nausea after drinking highly acidic coffee. The present invention reduces the acid content by steeping the grinds in relatively low temperature water. A low temperature steeping process requires a relatively long time to produce a full flavored coffee. The present invention automatically applies the lowest temperature possible to produce a full flavored coffee within a time period selected by the user.

Steaming hot water is commonly used for brewing coffee because heat accelerates the brewing process. There are many hot water processes for brewing coffee. Drip brewing has become the most popular because it is fast and automatic. The drip brewing process drips hot water over coffee grinds, through a filter and into a pot. Despite its popularity the drip brewing process extracts undesirable acids from the grinds because the process uses hot water. Drip machines concentrate the flow of hot water on the central grinds while leaving the periphery grinds relatively unsaturated. Coffee is wasted because the extraction process is incomplete. To overcome this problem some patented coffee makers feature a mechanical agitator to equally expose all the grinds to the brewing process. For the purpose of conserving coffee the cost and complexity of the agitating mechanism is not merited. Drip machines are very tall because the filter basket is located above the pot. They must be dragged out from under the cabinet to pour water into the top. Steam emitted from the top attacks the paint and the wooden structure of the cabinet. The massive size of drip coffee machines makes them unsightly and obtrusive. The most significant drawback of drip machines is that they produce mediocre coffee with a high acid content.

Another popular process of making coffee with hot water is the French method. This process consists of steeping loose coffee grinds in hot water. There are many patented machines for making French coffee. Most are manually operated machines comprising a cylindrical pot and a piston like filter which seals against the walls of the pot. The filter is manually pressed to the bottom of the pot to separate the grinds from the liquid coffee. The French process produces a rich flavored coffee because the grinds are totally saturated in water to gain a complete extraction of coffee flavorings. French brewed coffee is traditionally poured into cups for immediate consumption which is a major reason for the high acclaim given to the fresh taste of French brewed coffee.

A cold steeping process, known as the Dutch method, produces a smooth rich tasting coffee with low acidity. The Dutch method consists of mixing loose coffee grinds in a container of cool water then leaving it to steep for at least 18 hours. The liquid coffee is poured through a filter into a second container in which the coffee is heated on a stove for drinking. While this process produces a very smooth tasting low acid coffee, it is not popular because it is a messy, slow, and totally manual process.

The present invention features a warm steeping process which is basically a combination of the French and Dutch processes. The best tasting coffee is achieved by steeping at a low temperature for a long time. The time required for the warm steeping process can be accommodated by preparing coffee at night for morning consumption. Many drip machines feature a built in timer which permits the machine to be set up at night to produce fresh coffee in the morning, but these machines remain dormant all night only to rush through the drip brewing process in the morning. In this instance the present invention uses all the hours of the night to slowly steep the coffee in warm water. The result is a low acid coffee with superior aroma and smooth taste. A computer controls the water temperature and the sequence of the steeping process. The computer is programmed to automatically heat the water to as low a temperature as possible for producing a full flavored coffee within a time period selected by the user. When the user selects a short steeping time, the computer automatically speeds up the process by using a higher water temperature. When the user selects a long steeping time the computer automatically slows down the processes by using a lower water temperature. The computer is permanently programmed to follow a time and temperature relationship which has been developed by laboratory testing. The present invention is easy to use. To prepare coffee the user loads the proper proportions of water and coffee grinds, sets the timer to the coffee ready time and presses the start button.

Most high quality coffee beans contain less acids than the low quality beans and for this reason high quality beans will produce a relatively low acid coffee even when brewed with a hot water process. The present invention can produce a fine flavored low acid coffee even from low quality beans if enough time is available for a low temperature process. This is a significant cost saving feature because high quality beans generally costs at least twice as much as a low quality beans. The present invention also saves cost by enhancing the extraction process in two ways. Firstly, the grinds are totally immersed in water which exposes all the grinds to the extraction process. Secondly, convection currents are induced by heat applied at the bottom of the pot. The convection currents move the liquid through the coffee grinds to further enhance the extraction process.

The present invention automates the task of making superior tasting coffee. Compared to other types of coffee machines the present invention is convenient, neat and inconspicuous.

OBJECTS OF THE INVENTION

A principal object of the invention is to automatically maintain the lowest water temperature possible to produce a full flavored coffee within a given time period.

Another object of the invention is to reduce the bitter tasting acid content in coffee.

A further object of the invention is to save cost by producing a fine tasting coffee with low cost coffee beans.

A still further object of the invention is to provide a compact and good looking coffee machine.

BRIEF DESCRIPTION OF THE DRAWINGS

The objects and advantages of the invention will be apparent upon reading the following description in conjunction with the drawings in which.

DETAILED DESCRIPTION OF THE INVENTION

Figure 3:
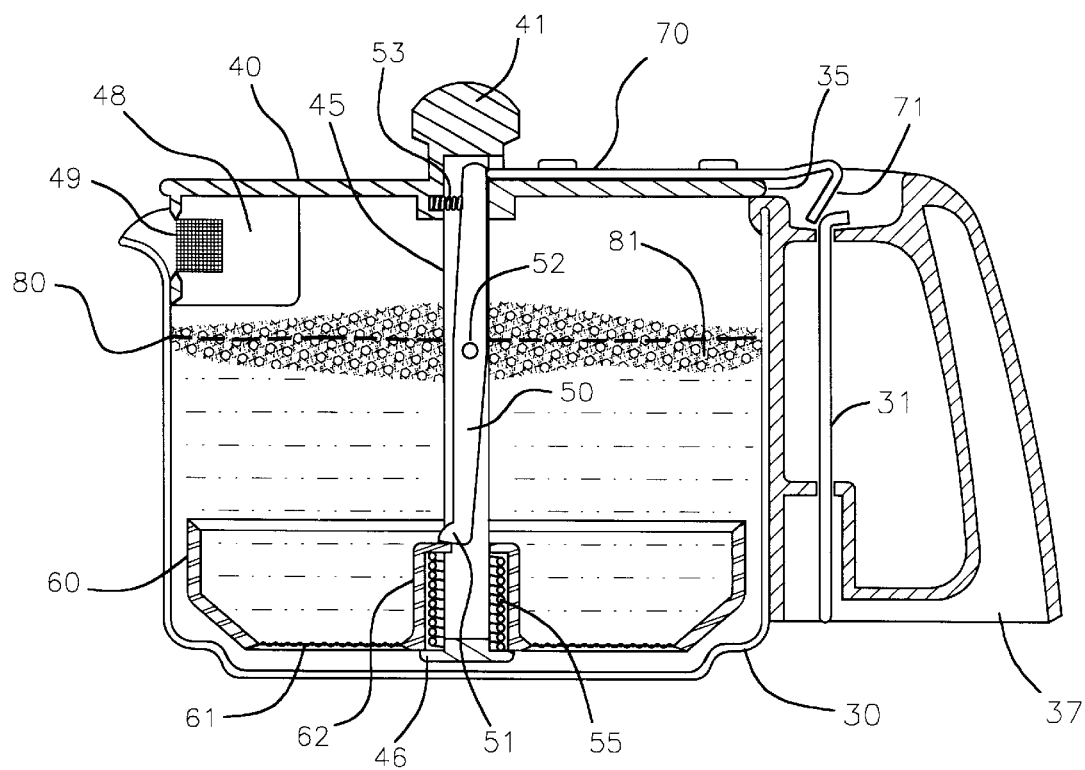
FIG. 3 is a cross-sectional view of the pot filled with liquid and with the filter basket submerged in the liquid.
Figure 4:
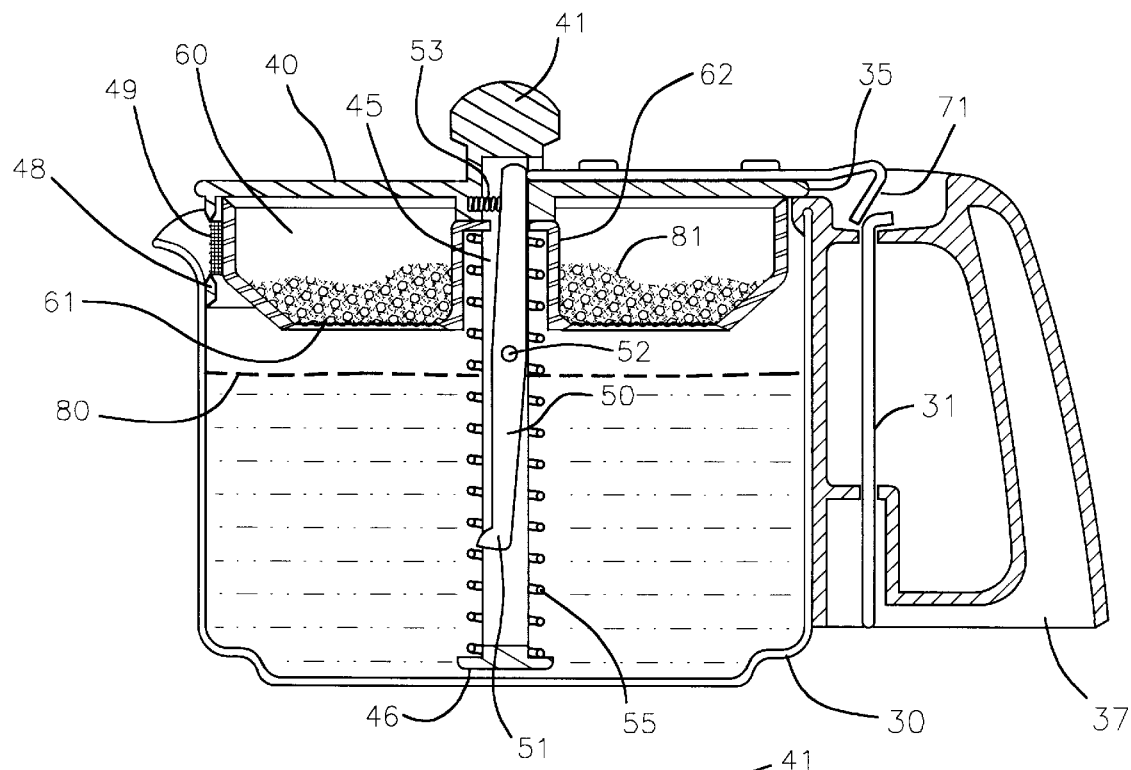
FIG. 4 is a cross-sectional view of the pot filled with liquid and with the filter basket lifted against the underside of the lid.
Figure 5:
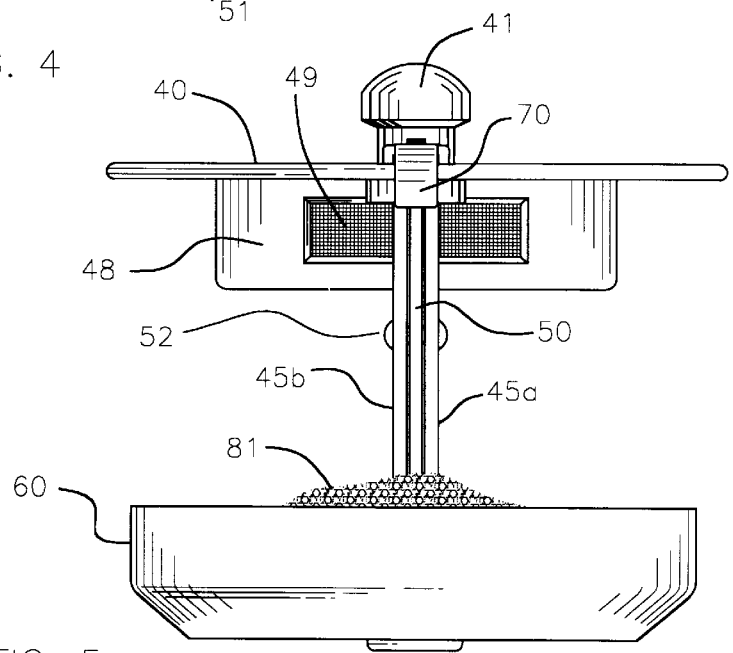
FIG. 5 is a rear view of the basket and lid assembly removed from the pot and with the basket latched in the down position.

Referring to FIGS. 3, 4 and 5, a pot 30 is shown filled to a water level 80. A lid 40 is snapped in place on top of the pot 30. A filter basket 60 is shown submerged in water at the bottom of the pot 30. A rocker 50 is pivotally supported on an axle pin 52 which extends between the parallel posts 45a and 45b as shown in FIG. 5. A catch 51 is a molded feature of rocker 50. The catch 51 is shown engaged with the central hub 62 of the filter basket 60. In this condition the catch 51 holds a compression spring 55 preloaded between the central hub 62 and a flange 46. The rocker 50 is urged to the latched condition by a small compression spring 53. The rocker 50 is released by a series of mechanical actions comprising: a push rod 31 which forces against a cam face 71 of a cross slide 70; which forces the rocker 50 to pivot and withdraw the catch 51 from the central hub 62; which permits the spring 55 to force the filter basket 60 out of the water. The bottom of the filter basket 60 is covered by a filter screen 61 through which water can pass but the coffee grinds 81 cannot. Most of the coffee grinds 81 are removed by the filter basket 60 as it lifts them from the liquid coffee and closes against the underside of the lid 40 as shown in FIG. 4. A filter skirt 48 is integrally molded with the lid 40. The filter skirt 48 seals against the inner wall of the pot 30. The filter skirt 48 has a window covered by a filter screen 49 which provides a final filter for catching residual grinds as the coffee is poured from the pot 30.

Referring to FIGS. 3 and 5, to prepare coffee a user first fills the pot 30 to a desired water level 80. To load the filter basket 60 a user holds the knob 41 in one hand and pulls on the filter basket 60 with the other hand. When the filter basket 60 is drawn away from the lid 40, the catch 51 snaps over the hub 62 to latch the filter basket 60 in the fully extended position. In this position the user scoops the appropriate volume of grinds 81 into the filter basket 60. Next the user lowers the filter basket 60 into the pot 30 and snaps the lid 40 in place by forcing the rear of the lid 40 into a detent 35 located at the top of a pot handle 37. With the lid 40 snapped in place the filter basket 60 is held at the bottom of the pot 30. The fresh grinds 81 immediately float out of the filter basket 60 and up to water level 80 and the steeping process begins.

Figure 1:
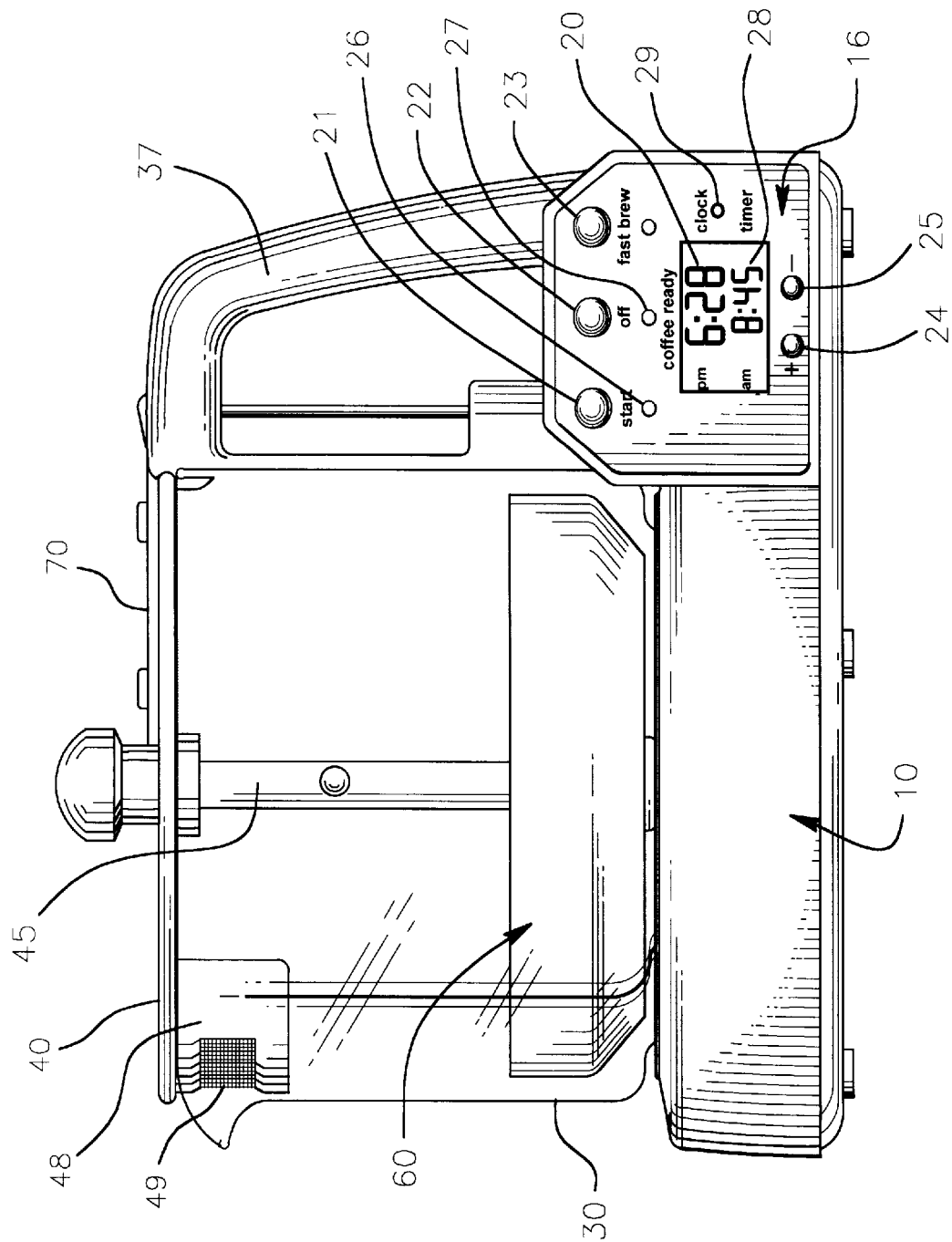
FIG. 1 is a front elevation.
Figure 2:
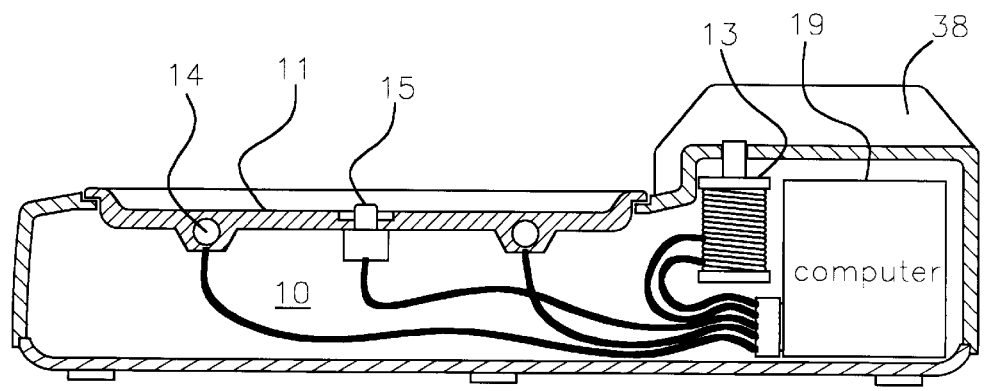
FIG. 2 is a cross-sectional view of the base unit with control panel removed.

Referring to FIGS. 1 and 2, a base unit assembly 10 houses: a hot plate 11; a heating element 14; a temperature sensor 15; a solenoid actuator 13; a control panel 16; and a computer 19. The hot plate 11 has a central opening which provides clearance for the temperature sensor 15. The heat intensity of the heating element 14 is adjusted by the computer 19 in response to an input signal from the temperature sensor 15. The computer 19 is programmed to keep the water at a minimum temperature for producing a full flavored rich tasting coffee within a time period selected by the user. As the water heats up a natural convection current is generated which helps to agitate the grinds and accelerate the steeping process.

Referring to FIGS. 1, 2, 3, and 4, a handle 37 is held in position by a receiving yoke 38 to align a solenoid actuator 13 with the push rod 31 in the handle 37. At the end of the steeping time, the computer 19 pulses the solenoid actuator 13 which forces the push rod 31 to trigger the release of the filter basket 60 as described previously. The filter basket 60 collects the grinds 81 as it ascends to the surface and is finally sprung firmly against the underside of the lid 40. Next, the computer 19 delivers maximum energy to the heating element 14 to quickly bring the liquid coffee up to a standard 175° F. drinking temperature. When the coffee reaches 175° F. a coffee-ready light 27 illuminates to indicate that the coffee is ready for drinking. The computer 19 continues to hold the temperature at 175° F. for a keep-warm period of 2 hours. At the end of the keep-warm period the computer 19 shuts off the power to terminate the cycle.

Referring to FIGS. 1 and 2, the computer 19 automatically controls the sequence and regulates the temperatures for the processes. A timer display 28 is settable in fifteen minute increments by pressing a + button 24 or a − button 25. Either of these buttons may be depressed for three seconds to engage a quick incrementing mode. Once the timer display 28 is set, a start button 21 must be pressed to initiate the cycle. A timed cycle indicator light 26 alerts the user that the machine is actively processing a timed cycle. For user convenience a clock display 20 displays the time of day. The clock is set by pressing a recessed button 29 and using the + button 24 or the − button 25 to set the time of day.

To make the best tasting coffee with the lowest acidity a long steeping period is needed. For this reason it is advisable to load the machine at night for breakfast coffee or in the morning for dinner/coffee. This is done by loading the water and coffee grinds and setting the timer display to the time the coffee is required.

The present invention can make coffee quickly if need be. A fast brew button 23 may be pressed to start the fast brew cycle. In this instance the water is heated as quickly as possible to a standard 175° F. drinking temperature. After a period of approximately twenty minutes, depending on the volume of water in the pot 30, the computer 19 pulses the solenoid 13 to release the spring loaded filter basket 60, at which time the coffee is immediately ready for drinking. The fast brew cycle sacrifices the benefits of low acid coffee but it produces a better tasting coffee than a drip brewing process because the grinds are fully immersed in hot water. This achieves a more complete extraction of the coffee flavorings, much like the renown French process.

An off button 22 provides means for aborting all active and timed functions.

Figure 6:
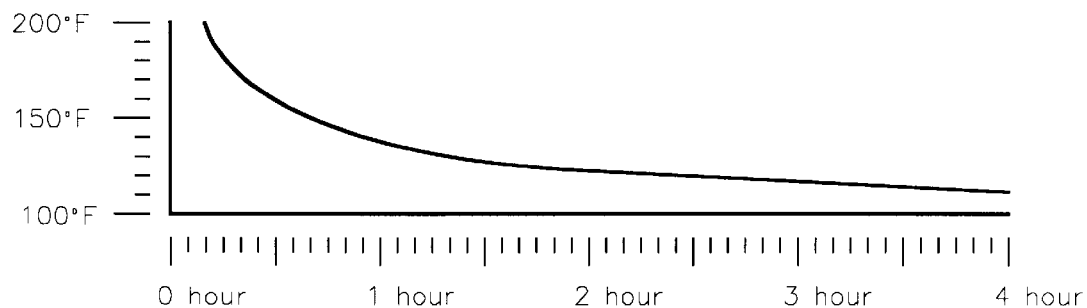
FIG. 6 is a chart showing the time and temperature relationship for steeping coffee.
Figure 7:
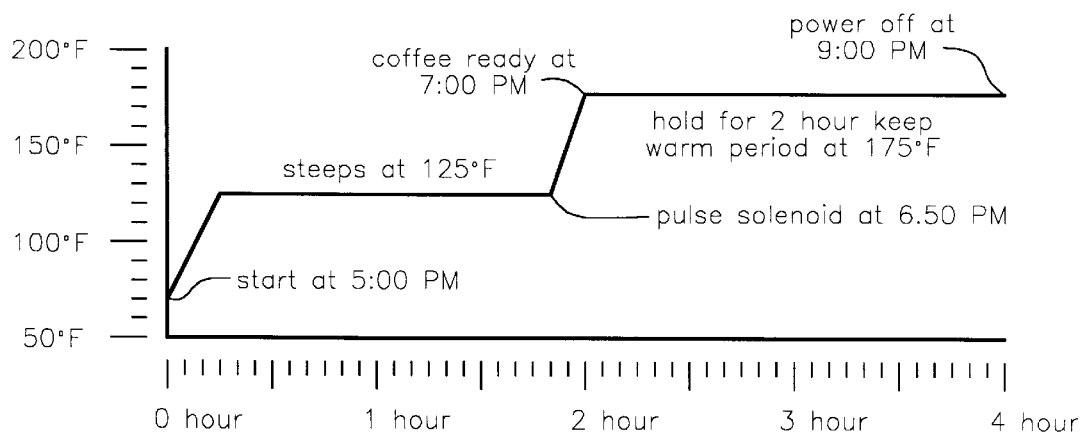
FIG. 7 is a chart showing the time and temperature sequence of an exemplary two hour cycle.

The ideal temperature for steeping coffee within a given period of time is a relationship which must be determined by laboratory tests. These tests are effectively performed by heating a standard ratio of coffee grounds and water to a specific steeping temperature. As the process matures it is tested progressively to determine the time period required to achieve peak flavor. This procedure is repeated through a range of temperatures until a complete set of data is attained. FIG. 6 shows an example of the results of a set of tests covering a full range of time and temperatures. For example, a time and temperature sequence which the computer 19 is programmed to follow with a two hour cycle is depicted by a chart shown in FIG. 7. The computer 19 is programmed to deliver a unique time and temperature sequence for each fifteen minute increment up to four hours. The quality of the coffee flavor does not notably improve when the steeping time exceeds four hours. For this reason when a steeping time exceeding four hours is selected, the computer 19 will inhibit all functions until the final four hours. At the final four hours the computer 19 follows the time and temperature sequence for four hours in accordance with the graph shown in FIG. 6.

The method described above for latching and lifting the basket assembly is a reliable and inexpensive method. However, it should be noted that this latching system may be substituted with a variety of alternative mechanisms. For example the filter basket 60 could be lifted from the coffee by a float attached to the bottom of the filter basket rather than a spring. It should also be noted that the temperature sensor 15 could be substituted with an alternative temperature control system which requires a manual selector or a float sensor to inform the computer 19 of the volume of water in the pot 30. With this arrangement the computer 19 would be programmed to maintain the energy level which holds the selected volume of water at a target temperature level. This program would include a series of energy levels for producing the range of target temperatures shown by the curve in FIG. 6.

What has been described is a novel computerized coffee maker for producing a low acid coffee with superior flavor. It is recognized that numerous changes to the described embodiment of the invention will be apparent to those skilled in the art without departing from its true spirit and scope. For example, although the present invention is referred to as a coffee maker, it could also be used for steeping tea. The invention is to be limited only as defined in the claims.

We claim:

1. A coffee steeping machine comprising:
   a pot for containing water and coffee grinds;
   a heating element for heating said water in said pot;
   a filter for separating said coffee grinds from said water;
   a lifting mechanism for raising said filter and said coffee grinds out of said water; and
   a pre programmed computer for automatically controlling the energy to said heating element and the activation of said lifting mechanism in accordance with a time based schedule including:
   a steeping temperature and steeping duration;
   a release time for said lifting mechanism;
   a final temperature and holding duration; and
   said time based schedule being automatically determined by said computer based on a time period selected by a user.

2. The coffee steeping machine of claim 1, wherein said lifting mechanism comprises:
   a filter basket;
   a compression spring urging said filter basket to a position out of said water; and
   a releasable latch holding said filter basket in a position in said water against the urging of said compression spring.

3. The coffee steeping machine of claim 2, wherein said filter basket, said compression spring and said releasable latch comprise a removable unitary structure.

4. The coffee steeping machine of claim 3, further including a solenoid, actuated in response to a signal from said computer, for releasing said releasable latch.

5. The coffee steeping machine of claim 4, further comprising:
   a sensor for sensing the temperature of said water; and
   said sensor providing an input to said time based schedule of said computer.

6. A coffee steeping machine comprising:
   a pot for containing water and coffee grinds;
   a filter for separating said coffee grinds from said water;
   a lifting mechanism for removing said filter and said coffee grinds out of said water,
   a releasable latch for mechanically restraining said lifting mechanism to a position with said filter and said coffee grinds in said water, both said lifting mechanism and said releasable latch being within said pot; and
   a computer-controlled trigger external to said pot for actuating said releasable mechanism.

7. The coffee steeping machine of claim 6, further comprising:
   a compression spring urging said filter and said coffee grinds to a position out of said water; and
   said releasable latch holding said filter and said coffee grinds in a position in said water against the urging of said compression spring.

8. The coffee steeping machine of claim 7, wherein said filter includes a basket, and wherein said basket, said compression spring and said releasable latch comprise a unitary structure that is removable from said pot.

9. The coffee steeping machine of claim 8, further including a solenoid, actuated in response to said computer controlled trigger, for releasing said releasable latch.

* * * * *